United States Patent [19]

McIntyre et al.

[11] Patent Number: 5,666,577
[45] Date of Patent: Sep. 9, 1997

[54] SYSTEM FOR SWITCHING POINTING INDICES IN LASER AIMED CAMERAS

[75] Inventors: Dale Frederick McIntyre, Honeoye Falls, N.Y.; Richard Edmund Albrecht, Durham, N.C.

[73] Assignee: Eastman Kodak Company, Rochester, N.Y.

[21] Appl. No.: 603,822

[22] Filed: Feb. 20, 1996

Related U.S. Application Data

[60] Provisional application No. 60/003,015, Aug. 31, 1995.
[51] Int. Cl.$^6$ .......................... G03B 29/00; G03B 13/02
[52] U.S. Cl. .......................... 396/296; 396/429; 396/431
[58] Field of Search .......................... 354/75, 76, 219, 354/165, 224; 396/296, 429, 431, 25, 28

[56] References Cited

U.S. PATENT DOCUMENTS

| | | | |
|---|---|---|---|
| 1,678,493 | 7/1928 | Van Albada. | |
| 2,604,002 | 7/1952 | Wengel | 88/1.5 |
| 5,059,019 | 10/1991 | McCullough | 352/131 |
| 5,189,463 | 2/1993 | Capper et al. | 354/403 |
| 5,205,044 | 4/1993 | DePaoli | 33/243 |
| 5,315,334 | 5/1994 | Inana | 354/219 |
| 5,386,260 | 1/1995 | Kirigaya | 354/289.12 |
| 5,420,657 | 5/1995 | Kosako | 354/219 |
| 5,485,241 | 1/1996 | Irie et al. | 354/410 |
| 5,500,702 | 3/1996 | Meyers | 354/165 |
| 5,537,181 | 7/1996 | Owashi et al. | 354/410 |
| 5,546,156 | 8/1996 | McIntyre | 354/400 |

FOREIGN PATENT DOCUMENTS 2 252 836 A  8/1992  United Kingdom .......................... 15/35

Primary Examiner—Michael L. Gellner
Assistant Examiner—Daniel Chapik
Attorney, Agent, or Firm—Edward Dugas

[57] ABSTRACT

In a camera having, a viewfinder, a microcontroller, and a laser pointer for providing a visible pointer, incorporated therein for aiding in the pointing of the camera the improvement comprising:

means for forming a like image of the visible pointer, viewable in the viewfinder; and means for controlling the presence of the like image in the viewfinder as a function of ambient light level.

5 Claims, 3 Drawing Sheets

SYSTEM FOR SWITCHING POINTING INDICES IN LASER AIMED CAMERAS

CROSS REFERENCE TO RELATED APPLICATION

Reference is made to and priority claimed from U.S. Provisional application Ser. No. 60/003,015, filed 31 Aug. 1995, entitled A SYSTEM FOR SWITCHING POINTING INDICES IN LASER AIMED CAMERAS.

CROSS-REFERENCE TO RELATED APPLICATIONS

The present application is related to U.S. application Ser. No. 08/201,827, filed Feb. 25, 1994, by Dale F. Mcintyre, and entitled, "Camera With Pointing Aid;" and U.S. application Ser. No. 08/242,891 filed May 16, 1994, by Dale F. Mcintyre, and entitled, "Laser Rep Rate Control System For Camera."

1. Field of The Invention

The invention relates generally to the field of cameras with a pointing or framing feature, and in particular to cameras which incorporate a laser to aid the photographer in pointing (aiming) the camera.

2. Background Of The Invention

With any image capture apparatus like a video camera, electronic still camera, or photographic still camera, the user of the device is normally forced to look through some viewfinding optics including some indicator marks which depict the outline of the frame, parallax correction, and autofocus marks. Recently, innovations in aiming image capture devices have included the use of low power visible laser diodes to help point the camera and compose the picture.

Other passive aiming systems on the market today, like those found in rifle scopes, make use of LEDs that are presented as a virtual image within the body of optics in a traditional rifle scope. They have adjustable brightness levels and operate from small batteries stored within the body of the rifle scope. Such rifle scopes are made by companies like AIMPOINT, INC.

In cameras such as the Canon EOS-10, fiducial marks used for indicating which of a plurality of autofocus detectors is actively being processed as the focus point are illuminated by an optical system with an LED.

In British Patent Number 2,252,836, a camera/flashlight/laser pointer apparatus is disclosed for the purpose of aiming a camera while in pursuit of a suspicious person. A traditional viewfinder is not needed with this apparatus. In U.S. Pat. No. 5,189,463 (Capper), a video camera is aimed with the assistance of a visible laser diode that is said to obviate the need for a user to look through a viewfinder. Yet in a small, portable, battery operated, all purpose camera, compromises must be made that require a traditional viewfinder. Incorporating laser assisted aiming and a traditional viewfinder in the same apparatus raise a new set of problems that must be solved.

In co-pending U.S. patent applications Ser. Nos. 08/201,827 (Mcintyre) and 08/242,891 (Mcintyre), a control system for a camera with a visible laser aiming system is disclosed where the laser power is controlled as a function of subject distance and ambient light. In one embodiment the laser is completely turned "off" when it is overwhelmed by ambient light level or a remote subject to conserve power. Given the relatively low power levels in a laser used for aiming a camera, a user quickly reaches the usable range of the laser in bright outdoor light and is forced to use the accompanying more traditional viewfinder optics. These passive optics do not resemble the laser pointer used at the lower light levels resulting in a confusing interface for the camera user.

SUMMARY OF THE INVENTION

The present invention is directed to overcoming one or more of the problems set forth above. Briefly summarized, according to one aspect of the present invention there is provided a camera having, a viewfinder, a microcontroller, and a laser pointer for providing a visible pointer, incorporated therein for aiding in the pointing of the camera the improvement comprising:

means for forming a like image of the visible pointer, viewable in the viewfinder; and means for controlling the presence of the like image in the viewfinder as a function of ambient light level.

This invention solves the problem of the laser's limited application in bright light and provides a more consistent appearance to the photographer. It is an object of the invention to combine (with a laser pointed camera) an alternate pointing system resident in the traditional viewfinding optics that automatically switches into operation in the event that the laser is unlikely to be helpful in pointing the camera.

Furthermore, it is another object of the invention to incorporate a user detection sensor near the traditional viewfinding optics which detects the intention of the user to use the conventional viewfinder versus the laser pointer and automatically switches to the alternate pointing system, as described above, which overrides the switching point chosen as a function of some scene measured parameter such as ambient light or subject distance.

Another object of the invention is to allow the user to manually instruct the camera control system to use either the laser pointer or the alternate system exclusively. It is sometimes desirable to turn "off" the laser pointer regardless of the ambient light or subject distance information in situations like weddings, churches, museums, etc. The opposite is true when the user desires to use the laser pointer only mode where it is felt that a user detection sensor could erroneously assume the desire to use the more traditional viewfinder.

The above and other objects of the present invention will become more apparent when taken in conjunction with the following description and drawings wherein identical reference numerals have been used, where possible, to designate identical elements that are common to the figures.

ADVANTAGEOUS EFFECT OF THE INVENTION

The present invention has the ability to switch between a visible, projected laser beam and a like image resemblance of the projected laser beam within the viewfinder which provides the user with a less confusing and consistent "look and feel" to the process of pointing a camera. The invention provides a means to automatically switch between modes and to sense the user's preferred mode of pointing the camera. The invention provides the ability to override and manually select a preferred mode.

DETAILED DESCRIPTION OF THE INVENTION

Figure 1:
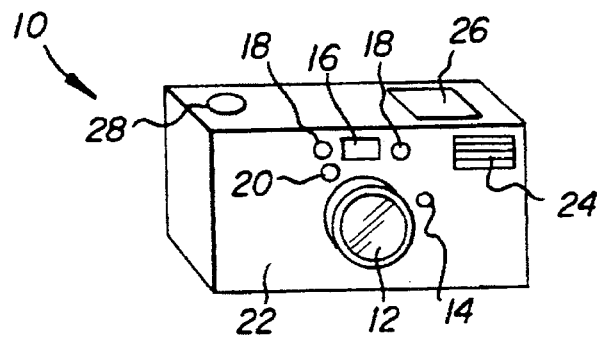
FIG. 1 is a perspective view of an NSLR camera incorporating a visible laser pointer.

Referring to FIG. 1, a non-SLR camera 10 is provided with a laser pointer 20 that generates at least one visible laser beam as a pointing aid. Also provided is a traditional viewfinder 16 centered above the camera's lens 12. While the viewfinder 16 is shown centered on the front of the camera 10, different traditional viewfinder 16 designs such as reverse galilean, real image, etc. take different optical paths through the camera body 22. A shutter button 28 causes the laser pointer 20 to emit the visible laser beam which is substantially aligned with the optical axis of the camera 10 as defined by the lens. 12. The laser pointer 20 is also substantially aligned with the camera's autofocus system 18. An exposure cell 14 senses ambient light and a flash 24 is activated when the sensed ambient light is below a predetermined threshold. An LCD display 26 functions to display the camera's operating information to the user.

Figure 2A:
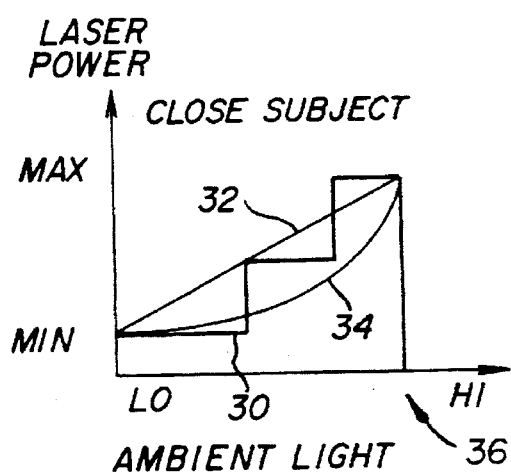
FIG. 2A is a chart depicting a three potential laser power control scheme based on measured ambient light levels with the laser power automatically switched "off" at a given ambient light level.

FIG. 2A shows by way of graphics three different control algorithms 30, 32, 34 for controlling the laser pointer's power as a function of ambient light. The algorithm 30 illustrates a quantized level of laser power as a function of specific ambient light ranges. Although three quantized steps are shown, more or less steps may be used without detracting from the teachings of the invention. The algorithm 32 illustrates a linear relationship between laser pointer power and ambient light. The algorithm 34 represents a non-linear relationship between ambient light and laser pointer power with an example of non-linearity being shown as an exponential curve. At control point 36, the usefulness of the laser as a pointing aid has diminished, because the laser beam is no longer usefully visible against the ambient light so the laser pointer power is turned "off" completely. As mentioned earlier, it is a central feature of the invention to automatically switch to the internal alternate aiming system when the ambient lighting level reaches control point 36.

Figure 2B:
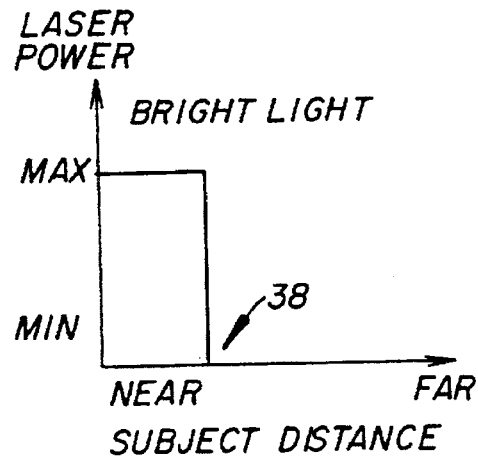
FIG. 2B is a chart depicting laser power control as a function of measured subject distance.

FIG. 2B graphically represents another control algorithm that controls the laser power as a function of subject distance as determined by the camera's autofocus system 18. In this case where ambient light is determined to be bright by the exposure cell 14 the laser pointer 20 is operated at full power for all distances until it ceases to be effective as shown at cutoff point 38 where the laser pointer is turned "off."

Figure 3:
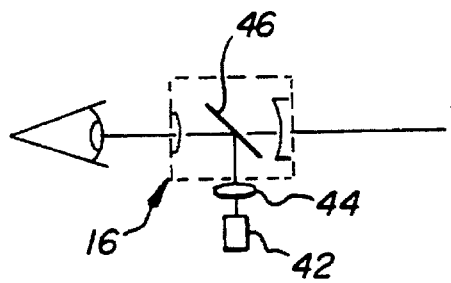
FIG. 3 is a scematic view of a user looking through a conventional viewfinder optic which has been modified per the present invention.

Referring now to FIG. 3, the optical viewfinder 16 is formed with a beamsplitting transparent mirror 46 which relays visible light from an LED 42 through a collimating lens 44 to the eye of the user as a virtual image. This virtual image resembles the image, both in shape and in color, that would be seen if the laser pointer 20 function were enabled.

Figure 4:
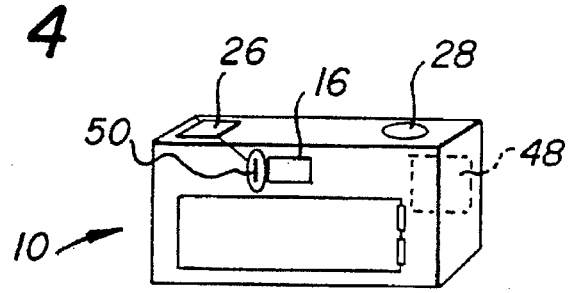
FIG. 4 is a perspective view of the back of a camera incorporating the present invention.

FIG. 4 is a back view of the camera 10 illustrating one site for a user sensor 50. The user sensor 50 functions to detect the presence of the user as the user positions his head to look through the viewfinder 16 as would be the case when the user prefers to use the traditional viewfinder 16 instead of the laser pointer 20. FIG. 4 also illustrates in dotted lines the approximate position of a microcontroller 48 for automatically controlling the functions of camera 10.

Figure 5:
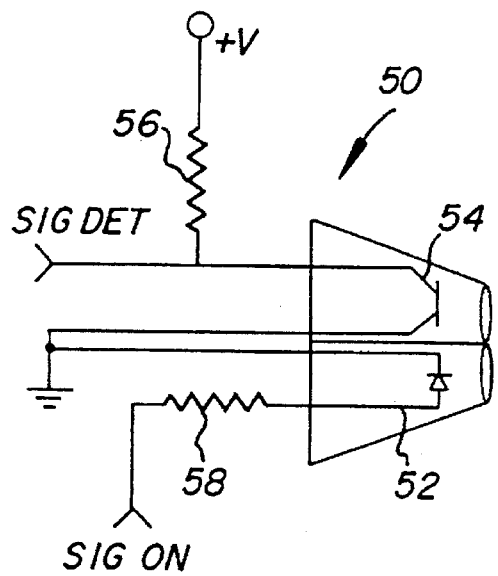
FIG. 5 is an electrical schematic of an infrared reflective sensor used in the camera of FIGS. 1 and 4.

Referring now to FIG. 5, the user sensor 50, in the preferred embodiment of the invention, takes the form of a traditional infrared reflective sensor assembly, commonly used in cameras for autofocus functions and shown in circuit detail only for purposes of explanation. Infrared light is emitted from an LED 52 when the signal Sig ON is active and is reflected off the user to impinge upon the photodetector 54 where it causes the signal Sig DET to change from a logic HIGH state to a logic LOW state. A pull-up resistor 56 is used to connect the Sig DET line to a +V source to provide the HIGH state and a resistor 58 is connected in series with the LED 52 to limit its current draw. The sensor portion containing the LED 52 and the photodetector 54 may be of the type manufactured by OPTEK Inc. and sold under their part no. OPB701AL. The microcontroller chip 48, within the camera 10, responds to Sig DET by turning "off" the laser pointer 20 while activating the internal alternate pointing aid that is LED 42 when the user's head is detected or when the ambient light is above the level of useful light that can be emitted by the laser pointer.

Figure 6A:
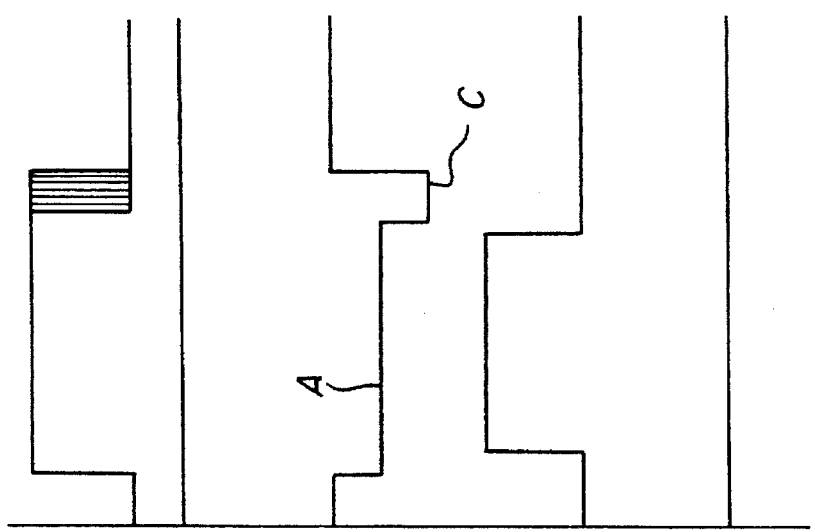
FIG. 6A is a timing diagram depicting a viewing of a scene through a traditional viewfinder and the appropriate switch of pointing indices between the laser pointer and the alternate pointing systems in conjunction with the operation of a shutter button.

FIG. 6A illustrates by waveforms the operating sequence of the shutter button 28, the laser pointer 20, and the user sensor's photodetector 54. The shutter button 28, in operation, moves from a rest position to a first level of depression indicated generally by the letter A. At that first level, the laser pointer is turned "on" and Sig ON goes HIGH to activate the LED 52 of the user sensor 50. The Sig DET signal goes "low" at point B indicating that a user's head is positioned for viewing through the view finder. When Sig DET goes "low", as sensed by the microcontroller 48, the laser is turned "off" and the LED 42 is turned "on" to provide a pointing spot 68, shown more clearly in FIG. 7B. Thereafter, the shutter button 28 is pressed to its second level indicated generally by the letter C which activates the shutter of camera 10 and also causes Sig ON to go "low" and the LED 42 to be turned "off" ready for the next picture taking cycle.

Figure 6B:
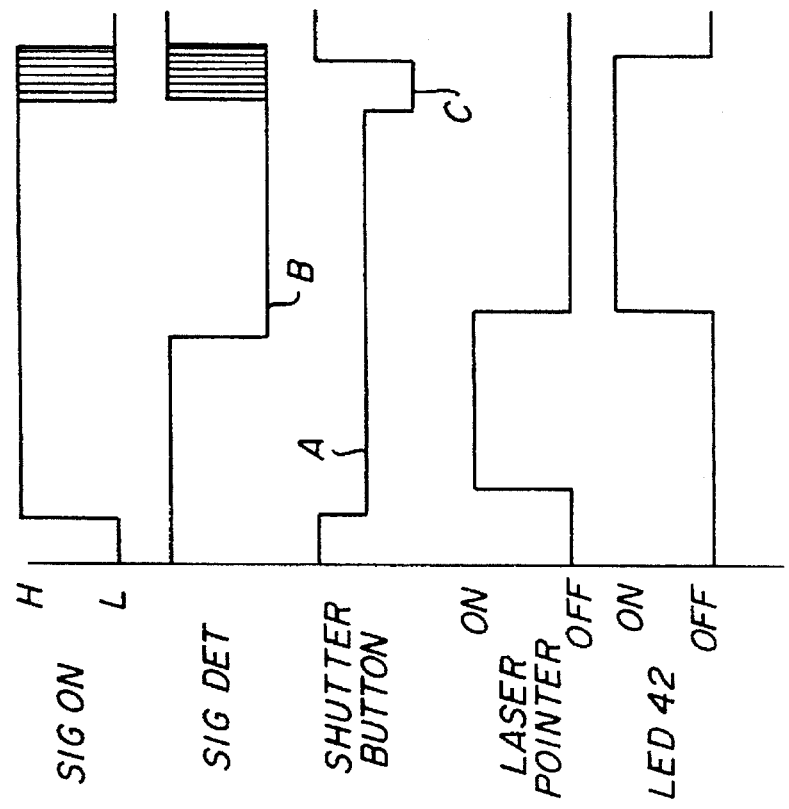
FIG. 6B is a timing diagram where only the laser pointer mode is used in conjunction with the shutter button.

FIG. 6B represents the condition where Sig DET does not change states, in other words the user is using the laser pointer 20 only and is not looking through the view finder 16, and therefore the laser pointer 20 remains active and the LED 42 does not have to simulate the laser pointer by producing the aiming spot 68.

Figure 7A:
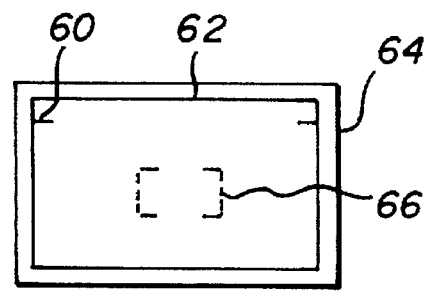
FIG. 7A illustrates a typical viewfinder display with a multitude of fiducial marks.

FIG. 7A shows the outline 64 of a conventional viewfinder 16 with parallax correction marks 60 and a framing fiducial outline 62. Traditional autofocus fiducial marks 66, illustrated by dotted lines, serve to confuse the user if combined with a laser pointer 20 and are therefore removed from cameras incorporating the present invention.

Figure 7B:
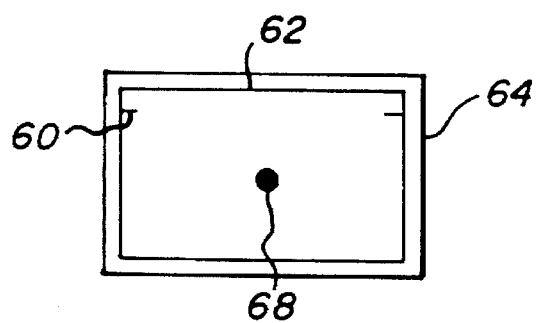
FIG. 7B illustrates a viewfinder display modified to demonstrate the effect of the alternate pointing system with a spot replacing a central fiducial aiming mark.

FIG. 7B illustrates the virtual image generated by the alternate internal pointing system, depicted in detail in FIG.

3, after the microcontroller 48 has executed the logic sequence illustrated in FIG. 6A. The resultant virtual image shown as a spot 68, corresponds both in shape and in color to the shape and color of the laser pointer when it is used for aiming so as to maintain a consistent visual interface for the user. It is to be understood that although the spot 68 is shown for simplicity the laser pointer may generate spots outlining the image to be captured by the camera or other such indicia based on the teachings of the present description and drawings.

The invention has been described with reference to a preferred embodiment. However, it will be appreciated that variations and modifications can be effected by a person of ordinary skill in the art without departing from the scope of the invention.

| Parts List: | |
|---|---|
| 10 | (non-SLR) camera |
| 12 | lens |
| 14 | exposure cell |
| 16 | viewfinder |
| 18 | autofocus system |
| 20 | laser pointer |
| 22 | camera body |
| 24 | flash |
| 26 | LCD display |
| 28 | shutter button |
| 30, 32, 34 | control algorithms exposure cell |
| 36 | control point |
| 38 | cutoff point |
| 42 | LED |
| 44 | collimating lens |
| 46 | beamsplitting transparent mirror |
| 48 | microcontroller (chip) |
| 50 | user sensor |
| 52 | LED |
| 54 | photodetector |
| 56 | resistor |
| 58 | resistor |
| 60 | parallax correction marks |
| 62 | framing fiducial outline |
| 64 | outline |
| 66 | autofocus fiducial marks |
| 68 | spot |

We claim:

1. In a camera having, a viewfinder, a microcontroller, and a laser pointer incorporated therein for providing an externally visible pointer for aiding in the pointing of the camera the improvement comprising:

means internal to the camera for forming an internal image of the visible pointer, viewable only in the viewfinder; and means for controlling the presence of the internal image in the viewfinder as a function of ambient light level.

2. The improvement in a camera according to claim 1 and further comprising:

means for sensing the presence of a user at the camera's view finder; and means for causing the presence of the internal image of the pointer to appear in the viewfinder irrespective of the ambient light level.

3. The improvement in a camera according to claim 1 wherein said means for forming the internal image of the pointer, is comprised of:

a beamsplitter positioned in the optical path of said viewfinder;

light means for generating visible light corresponding in shape to the externally visible pointer; and lens means interposed between said light means and said beamsplitter for providing a user viewable internal image of the pointer in the viewfinder.

4. The improvement in a camera according to claim 1 wherein said means for controlling the presence of the internal image of the pointer in the viewfinder as a function of ambient light level also controls the presence of the internal image of the pointer as a function of distance between the camera and a subject.

5. In a camera having, a viewfinder, a microcontroller, and a laser incorporated therein for providing an externally visible pointer, for aiding in the pointing of the camera the improvement comprising:

means for sensing the presence of a user at the camera's viewfinder;

means internal to the camera for forming an internal image of the pointer in the viewfinder; and means for controlling the presence of the internal image of the pointer in the viewfinder as a function of the sensed presence of the user at the camera's viewfinder.

* * * * *